(12) United States Patent
Lee et al.

(10) Patent No.: US 7,695,241 B2
(45) Date of Patent: Apr. 13, 2010

(54) DOWNSTREAM PLASMA SHIELDED FILM COOLING

(75) Inventors: Ching-Pang Lee, Cincinnati, OH (US); Aspi Rustom Wadia, Loveland, OH (US); David Glenn Cherry, Loveland, OH (US); Je-Chin Han, College Station, TX (US)

(73) Assignee: General Electric Company, Schenectady, NY (US)

( * ) Notice: Subject to any disclaimer, the term of this patent is extended or adjusted under 35 U.S.C. 154(b) by 630 days.

(21) Appl. No.: 11/606,853

(22) Filed: Nov. 30, 2006

(65) Prior Publication Data

US 2008/0131265 A1    Jun. 5, 2008

(51) Int. Cl.
*F01D 5/18* (2006.01)
*F01D 25/12* (2006.01)
*F04D 29/58* (2006.01)

(52) U.S. Cl. .......................... 415/1; 415/115; 415/914; 416/97 R; 165/903; 60/757

(58) Field of Classification Search .................. 415/1, 415/10, 115, 116, 914; 416/95, 96 A, 96 R, 416/97 R; 60/757; 165/903, 908
See application file for complete search history.

(56) References Cited

U.S. PATENT DOCUMENTS

| | | | |
|---|---|---|---|
| 5,181,379 A | 1/1993 | Wakeman et al. | |
| 5,233,828 A | 8/1993 | Napoli | |
| 5,241,827 A | 9/1993 | Lampes | |
| 5,320,309 A | * 6/1994 | Nosenchuck et al. | ........ 244/205 |
| 5,337,568 A | 8/1994 | Lee et al. | |
| 5,419,681 A | 5/1995 | Lee | |
| 5,465,572 A | 11/1995 | Nicoll et al. | |

(Continued)

FOREIGN PATENT DOCUMENTS

EP    1906136 A1    9/2008

(Continued)

OTHER PUBLICATIONS

European Search Report and Opinion, Application No. EP07254056, Mar. 12, 2009, 10 pages.

(Continued)

*Primary Examiner*—Edward Look
*Assistant Examiner*—Sean J Younger
(74) *Attorney, Agent, or Firm*—William Scott Andes; Steven J. Rosen (57) ABSTRACT

An downstream plasma boundary layer shielding system includes film cooling apertures disposed through a wall having cold and hot surfaces and angled in a downstream direction from a cold surface of the wall to an outer hot surface of the wall. A plasma generator located downstream of the film cooling apertures is used for producing a plasma extending downstream over the film cooling apertures. Each plasma generator includes inner and outer electrodes separated by a dielectric material disposed within a groove in the outer hot surface. The wall may be part of a hollow airfoil or an annular combustor or exhaust liner. A method for operating the downstream plasma boundary layer shielding system includes forming a plasma extending in the downstream direction over the film cooling apertures along the outer hot surface of the wall. The method may further include operating the plasma generator in steady state or unsteady modes.

27 Claims, 6 Drawing Sheets

U.S. PATENT DOCUMENTS

| | | | |
|---|---|---|---|
| 5,503,529 | A | 4/1996 | Anselmi et al. |
| 5,651,662 | A | 7/1997 | Lee et al. |
| 5,660,525 | A | 8/1997 | Lee et al. |
| 5,747,769 | A | 5/1998 | Rockstroh et al. |
| 6,570,333 | B1 * | 5/2003 | Miller et al. ........... 315/111.21 |
| 6,609,884 | B2 * | 8/2003 | Harvey ....................... 415/115 |
| 6,619,030 | B1 | 9/2003 | Seda et al. |
| 6,655,149 | B2 | 12/2003 | Farmer et al. |
| 6,708,482 | B2 | 3/2004 | Seda |
| 6,715,292 | B1 * | 4/2004 | Hoke ........................... 60/748 |
| 6,732,502 | B2 | 5/2004 | Seda et al. |
| 6,761,956 | B2 | 7/2004 | Lee et al. |
| 6,805,325 | B1 * | 10/2004 | Malmuth et al. ............ 244/205 |
| 6,991,430 | B2 | 1/2006 | Stec et al. |
| 7,008,179 | B2 | 3/2006 | Rinck et al. |
| 7,094,027 | B2 | 8/2006 | Turner et al. |
| 2006/0005545 | A1 | 1/2006 | Samimy et al. |
| 2006/0104807 | A1 | 5/2006 | Lee |

FOREIGN PATENT DOCUMENTS

WO     WO2005/114013 A1     12/2005

OTHER PUBLICATIONS

AIAA 2007-647, Stereo PIV of a Turbine Tip Clearance Flow with Plasma Actuation, Daniel K. Van Ness II, Thomas C. Corke, and Scott C. Morris, 22 pages.

AIAA 2006-20, "Turbine Blade Tip Leakage Flow Control by Partial Squealer Tip and Plasma Actuators", Travis Douville, Julia Stephens, Thomas Corke, and Scott Morris, 18 pages.

AIAA 2005-782, "Tip Clearance Control Using Plasma Actuators", Scott C. Morris, Thomas C. corke, Daniel Van Ness, Julia Stephens, and Travis Douville, 8 pages.

XP007907306, "Active Flow Control in Turbomachinery Using Phased Plasma Actuators", B. Goksel and I. Rechenberg, 2 pages.

XP009112404, "Turbine Tip Clearance Flow Control using Plasma Actuators", Daniel K. Van Ness II, Thomas Co. Corke, and Scott C. Morris, 12 pages.

Science Direct, "SDBD plasma enhanced aerodynamics: concepts optimization and applications", Thomas C. Corke, Martiqua L. Post, and Dmitry M. Orlov, 26 pages.

XP007907356, "Plasma (physics)", From Wikipedia, 16 pages.

XP007907353, "Dielectric barrier discharge", From Wikipedia, 2 pages.

"Overview of Plasma Flow Control: Concepts, Optimization, and Applications", Thomas C. Corke and Martiqua L. Post, 43rd AIAA Aerospace Sciences Meeting and Exhibit, Jan. 10-13, 2005, Reno, Nevada, AIAA 2005-563, 15 pages.

"Plasma Control Of Boundary Layer Using Low-Temperature Non-Equilibrium Plasma of Gas Discharge", D.F. Opaits, D.V. Roupassov, S.M. Starikovskaia, A.Yu. Starikovskii, I.N. Zavialov, and S.G. Saddoughi, 43rd AIAA Aerospace Sciences Meeting and Exhibit, Jan. 10-13, 2005, Reno, Nevada, AIAA 2005-1180, 6 pages.

"Demonstration Of Separation Delay With Glow-Discharge Plasma Actuators", Lennart S. Hultgren and David E. Ashpis, 41st AIAA Aerospace Sciences Meeting and Exhibit, Jan. 6-9, 2003, Reno, Nevada, AIAA 2003-1025, 10 pages.

"Unsteady Plasma Actuators for Separation Control of Low-Pressure Turbine Blades", Junhui Huang, Thomas C. Corke and Flint O. Thomas, AIAA Journal, vol. 44, No. 7, Jul. 2006, pp. 1477-1487.

"Control of Separation in Turbine Boundary Layers", R.B. Rivir, R. Sondergaard, J.P. Bons, and N. Yurchenko, 2nd AIAA Flow Control Conference, Jun. 28-Jul. 1, 2004, Portland, Oregon, 16 pages.

"Plasma Flow Control Optimized Airfoil", Thomas C. Corke, Benjamin Mertz, and Mehul P. Patel, 44th AIAA Aerospace Sciences Meeting and Exhibit, Jan. 9-12, 2006, Reno, Nevada, AIAA 2006-1208, 13 pages.

"Control of Transitional and Turbulent Flows Using Plasma-Based Actuators", Miguel R. Visbal, Datta V. Gaitonde, and Subrata Roy, 36th AIAA Fluid Dynamics Conference and Exhibit, Jun. 5-8, 2006, San Francisco, California, AIAA 2006-3230, 22 pages.

"AC and Pulsed Plasma Flow Control", R. Rivir, A. White, C. Carter, B. Ganguly, J. Jacob, A. Forelines, and J. Crafton, 42nd AIAA Aerospace Sciences Meeting and Exhibit, Jan. 5-8, 2004, Reno, Nevada, AIAA 2004-847, 9 pages.

"Effects of Plasma Induced Velocity On Boundary Layer Flow", Brian E. Balcer, Milton E. Franke, and Richard B. Rivir, 44th AIAA Aerospace Sciences Meeting and Exhibit, Jan. 9-12, 2006, Reno, Nevada, AIAA 2006-875, 12 pages.

"Flow Control Using Plasma Actuators and Linear / Annular Plasma Synthetic Jet Actuators", Arvind Santhanakrishan, Jamey D. Jacob, and Yildirim B. Suzen, 3rd AIAA Flow Control Conference, Jun. 5-8, 2006, San Francisco, California, AIAA 2006-3033, 31 pages.

"Turbulent Drag Reduction by Surface Plasma through Spanwise Flow Oscillation", Timothy N. Jukes, Kwing-So Choi, Graham A. Johnson, and Simon J. Scott, 3rd AIAA Flow Control Conference, Jun. 5-8, 2006, San Francisco, California, AIAA 2006-3693, 14 pages.

* cited by examiner

DOWNSTREAM PLASMA SHIELDED FILM COOLING

BACKGROUND OF THE INVENTION

1. Field of the Invention

The invention relates to film cooling of hot surfaces such as those found in hot aircraft gas turbine engine components and, particularly, to film cooling holes such as those found in combustor liners and turbine nozzle airfoils in gas turbine engines.

2. Description of Related Art

A typical gas turbine engine of the turbofan type generally includes a forward fan and a booster or low pressure compressor, a middle core engine, and a low pressure turbine which powers the fan and booster or low pressure compressor. The core engine includes a high pressure compressor, a combustor and a high pressure turbine in a serial flow relationship. The high pressure compressor and high pressure turbine of the core engine are connected by a high pressure shaft. High pressure air from the high pressure compressor is mixed with fuel in the combustor and ignited to form a very hot high energy gas stream. The gas stream flows through the high pressure turbine, rotatably driving it and the high pressure shaft which, in turn, rotatably drives the high pressure compressor.

The gas stream leaving the high pressure turbine is expanded through a second or low pressure turbine. The low pressure turbine rotatably drives the fan and booster compressor via a low pressure shaft. The low pressure shaft extends through the high pressure rotor. Most of the thrust produced is generated by the fan. Marine or industrial gas turbine engines have low pressure turbines which power generators, ship propellers, pumps and other devices while turboprops engines use low pressure turbines to power propellers usually through a gearbox.

The high pressure turbine has a turbine nozzle including at least one row of circumferentially spaced apart airfoils or vanes radially extending between radially inner and outer bands. The vanes are usually hollow having an outer wall that is cooled with cooling air from the compressor. Hot gases flowing over the cooled turbine vane outer wall produces flow and thermal boundary layers along hot outer surfaces of the vane outer wall and end wall hot surfaces of the inner and outer bands over which the hot gases pass.

Film cooling is widely used in gas turbine hot components, such as combustor liners, turbine nozzle vanes and bands, turbine blades, turbine shrouds, and exhaust nozzles and exhaust nozzle liners such as those used for afterburning engines. Film cooling is used to inject cooler air through film cooling holes or slots to form an insulating layer or cooling film on the component hot surface and reduce the direct contact with the hot gases flowing over the component surface. The film cooling holes are typically angled in a downstream direction so that the cooling air is injected into the boundary layer along or as close as possible to the hot surface. The cooling film flow can mix with the hot gas and reduce its effectiveness as it flows in the downstream direction. The hot gas flowing over the component hot surface can lift the cooling film away from the hot surface and reduce the film cooling effectiveness. One method to improve the film attachment is to use a shaped film cooling hole having a downstream flare at an exit of the hole to reduce the angle between the film jet exiting the hole and the downstream hot surface. This method has been used in turbine airfoils where the gas velocity is relatively high. It is desirable to have another or additional apparatus and/or method that can enhance the cooling film attachment to the hot surface for good film cooling effectiveness.

SUMMARY OF THE INVENTION

A downstream plasma boundary layer shielding system includes film cooling apertures disposed through a wall and angled in a downstream direction from a cold surface of the wall to an outer hot surface of the wall. A plasma generator located downstream of the film cooling apertures is used to produce a plasma extending over the hot surface of the wall downstream of the film cooling apertures.

In an exemplary embodiment of the system, the plasma generator is mounted on the wall and includes inner and outer electrodes separated by a dielectric material. An AC power supply is connected to the electrodes to supply a high voltage AC potential to the electrodes. The dielectric material being disposed within a groove in the outer hot surface of the wall.

A more particular embodiment of the system further includes a gas turbine engine vane including the wall defining at least in part a hollow airfoil of the vane. The airfoil extends radially in a spanwise direction between radially inner and outer bands and in the downstream direction and in a chordwise direction between opposite leading and trailing edges. The airfoil may be part of a high pressure turbine nozzle vane. The plasma generator may be mounted on the airfoil with the dielectric material disposed within a spanwise extending groove in an outer hot surface of the airfoil.

Another more particular embodiment of the system further includes the wall being annular and defining at least in part a gas turbine engine combustor liner and the groove being annular.

A method for operating a downstream plasma boundary layer shielding system includes energizing a plasma generator to form a plasma extending in a downstream direction over film cooling apertures disposed through a wall and along an outer hot surface of the wall. The plasma generator may be operated in steady state or unsteady modes.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
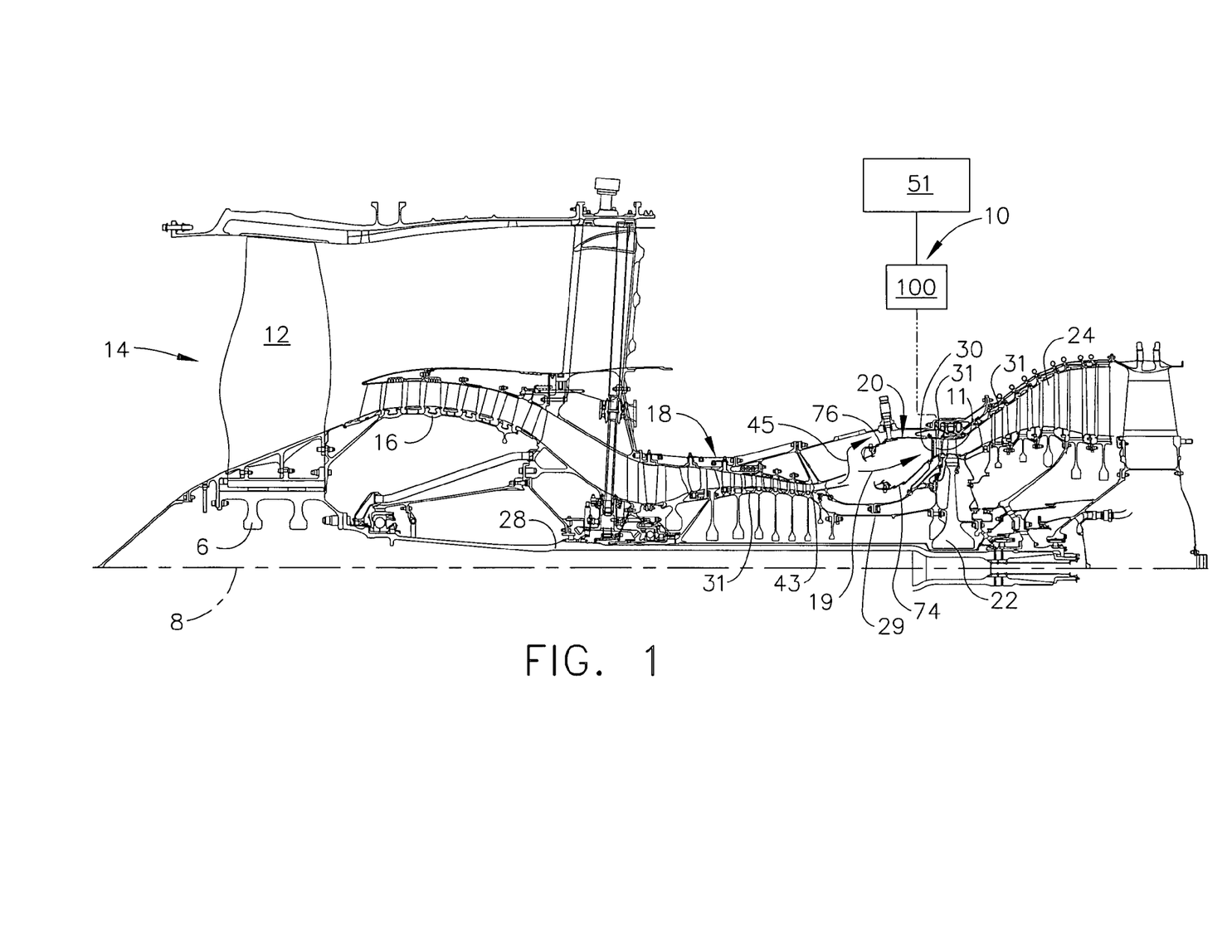
FIG. 1 is a longitudinal, sectional view illustration of exemplary embodiment of an aircraft gas turbine engine with a downstream plasma boundary layer shielding system illustrated for nozzle vanes of a high pressure turbine section of the engine.

Illustrated in FIG. 1 is an exemplary turbofan gas turbine engine 10 circumscribed about an engine centerline axis 8 and having a fan 12 which receives ambient air 14, a booster or low pressure compressor (LPC) 16, a high pressure compressor (HPC) 18, a combustor 20 which mixes fuel with the air 14 pressurized by the HPC 18 for generating combustion gases or gas flow 19 which flows in a downstream direction (D) through a high pressure turbine (HPT) 22, and a low pressure turbine (LPT) 24 from which the combustion gases are discharged from the engine 10. The HPT 22 is joined to the HPC 18 to substantially form a high pressure rotor 29. A low pressure shaft 28 joins the LPT 24 to both the fan 12 and the low pressure compressor 16. The second or low pressure shaft 28 which is at least in part rotatably disposed co-axially with and radially inwardly of the first or high pressure rotor.

Figure 2:
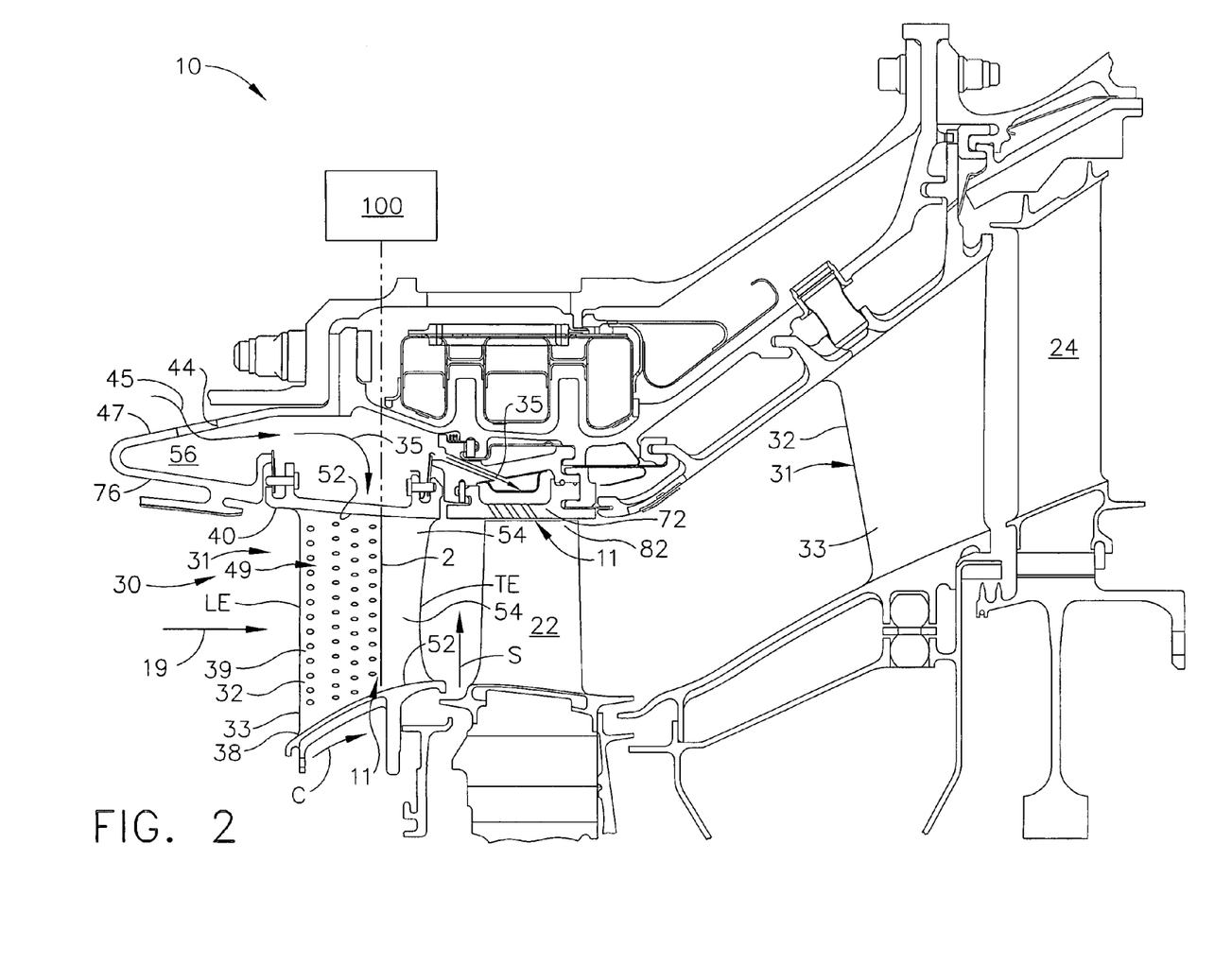
FIG. 2 is an enlarged view of the nozzle vanes and the downstream plasma boundary layer shielding system illustrated in FIG. 1.
Figure 3:
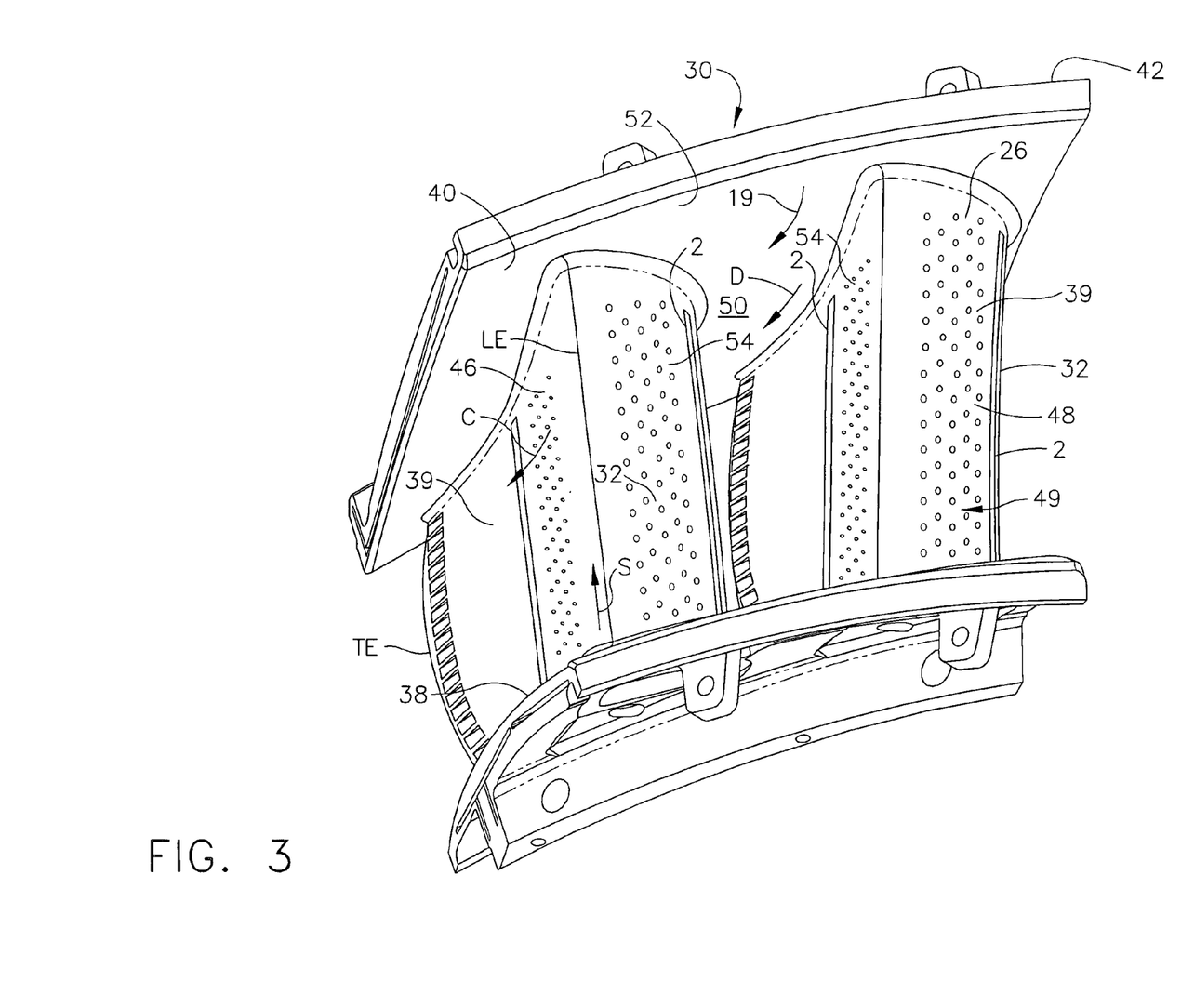
FIG. 3 is an enlarged perspective view of the vanes and plasma generators of the downstream plasma boundary layer shielding system illustrated in FIG. 2.

Illustrated in FIGS. 2 and 3 is the turbine nozzle 30 of the high pressure turbine 22 through which the hot gas flow 19 is discharged into from the combustor 20. The main combustor 20 includes inner and outer combustor liners 74, 76. The exemplary embodiment of the turbine nozzle 30, which is also more generally referred to as a vane assembly 31, illustrated in FIGS. 2 and 3 includes a row 33 of circumferentially spaced apart vanes 32 extending radially in a spanwise direction S between radially inner and outer bands 38, 40, respectively. In the exemplary embodiment of the turbine nozzle 30 illustrated herein, the bands and vanes are formed in circumferential segments 42 typically, with two vanes 32 per segment 42. There may be more than two segments and the segments typically have axial split lines suitably joined together by conventional spline seals therebetween. A portion of compressor discharge air 45 is used to supply pressurized cooling air 35 to the turbine nozzle 30 for cooling the various components thereof including the hollow airfoils 39 and inner and outer bands. Cooling air 35 is also used to film cool an annular shroud 72 surrounding rotatable blade tips 82 of the high pressure turbine 22.

Figure 4:
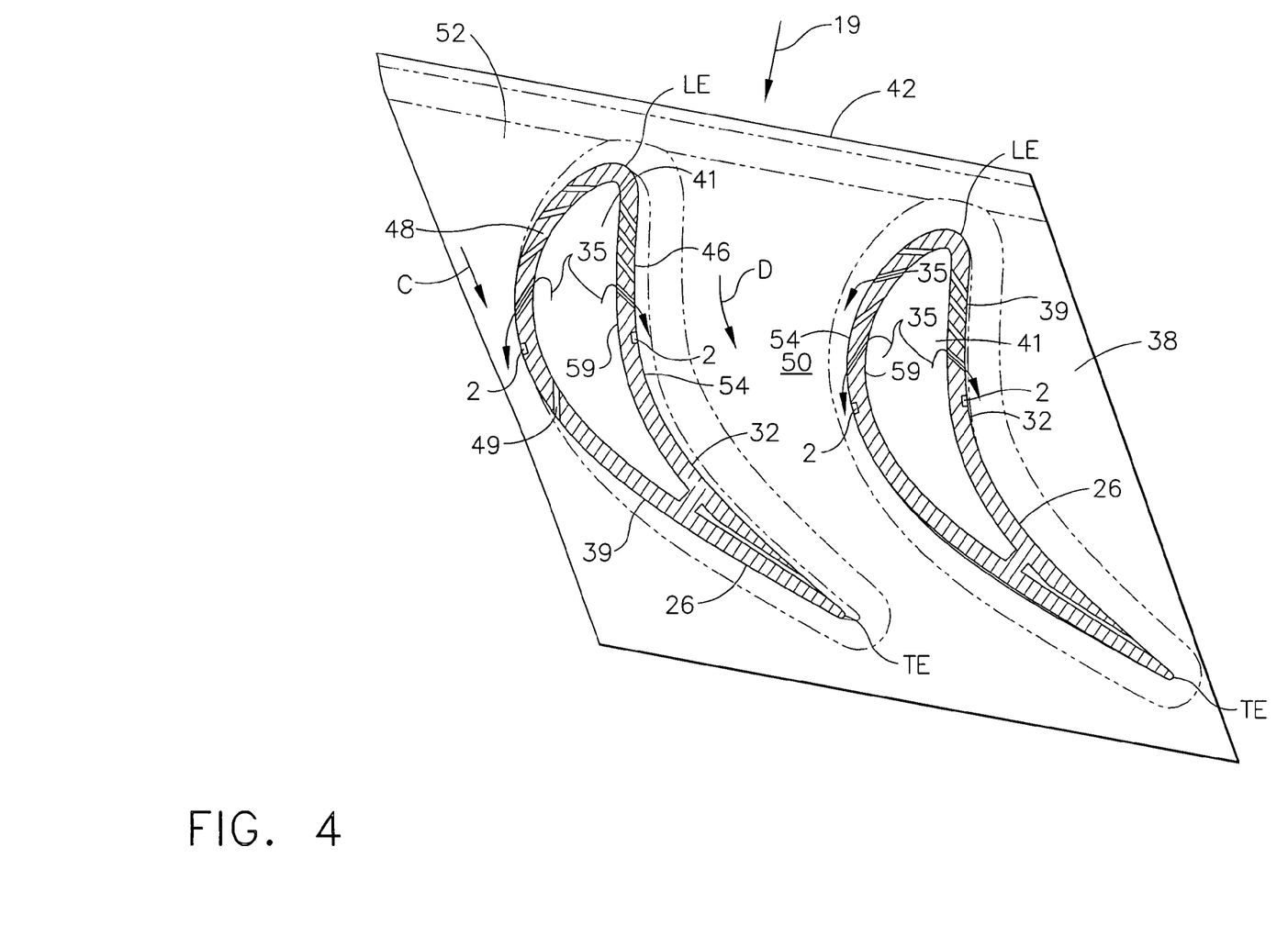
FIG. 4 is a cross sectional view illustration through the vanes illustrated in FIG. 3.

Referring to FIGS. 3 and 4, each airfoil 39 includes an outer wall 26 having a pressure side 46 and a circumferentially opposite suction side 48 which extend axially in a chordwise direction C between opposite leading and trailing edges LE, TE, respectively. The airfoils 39 and the outer walls 26 extend radially in a spanwise direction S between the inner and outer bands 38, 40. The bands are typically integrally cast with the corresponding vanes during initial manufacture thereof. The hot combustion gas flow 19 pass through flow passages 50 between the airfoils 39. The flow passages 50 are bound by inboard hot surfaces 52, with respect to the gas flow 19, of the inner and outer bands 38, 40 and outer hot surfaces 54 of then outer wall 26 along the pressure and suction sides 46, 48 of the airfoils 39.

Figure 5:
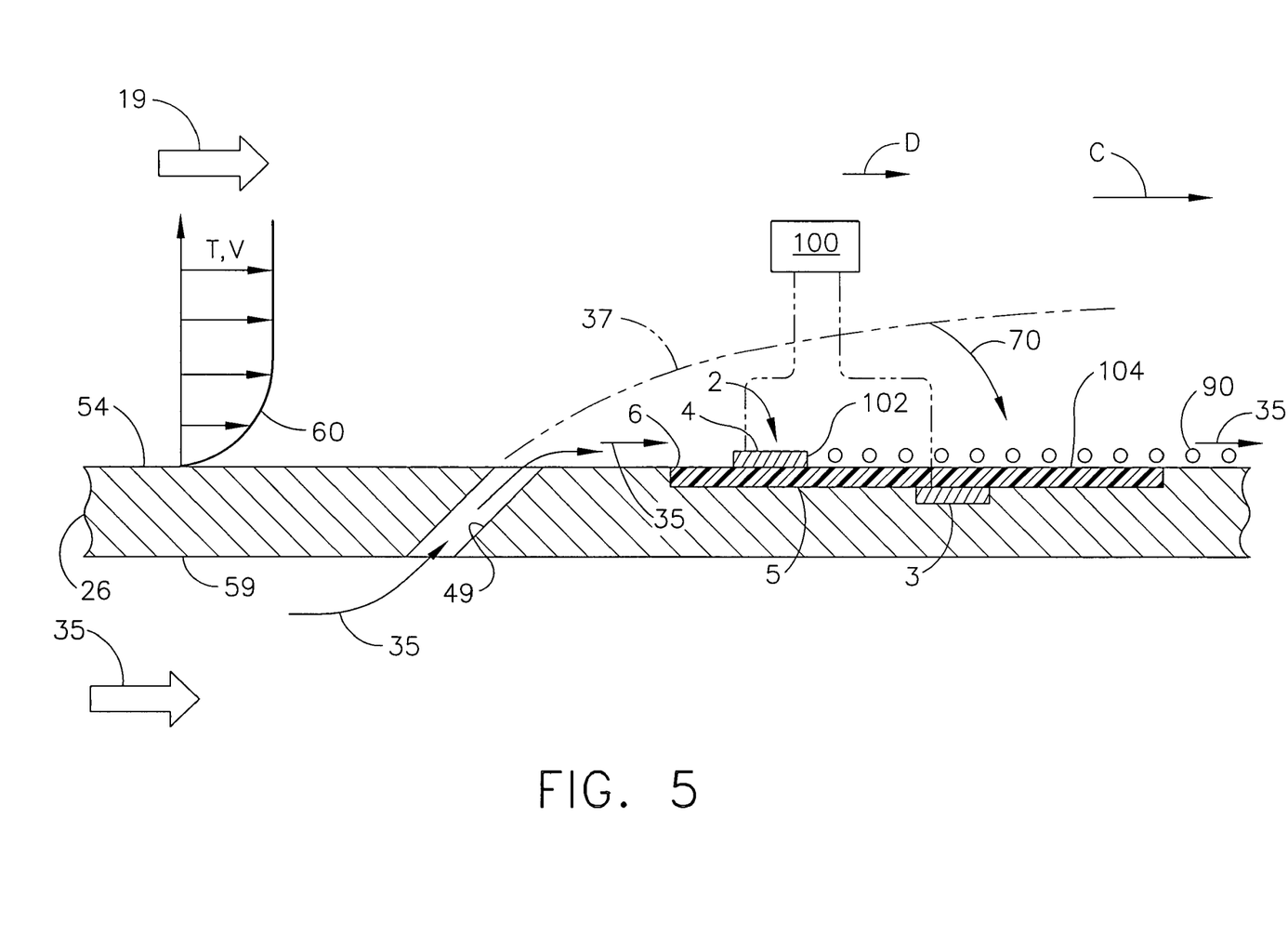
FIG. 5 is a schematical and partial graphical illustration of the downstream plasma boundary layer shielding system with the plasma generators illustrated in FIG. 4 energized and a boundary layer.

The hot combustion gas flow 19 flowing over the cooled turbine vanes 32 and outer walls 26 form a flow boundary layer 60 along the inboard hot surfaces 52 of the inner and outer bands 38, 40 and, as schematically illustrated in FIG. 5, along the outer hot surfaces 54 of the pressure and suction sides 46, 48 of the outer walls 26. There is a velocity gradient V and a gas temperature gradient T within the flow boundary layer 60 adjacent to the outer hot surfaces 54 of the pressure and suction sides 46, 48 of the outer walls 26. The gas temperature gradient T and the hot gas flow 19 causes unwanted and undesirable heating along the outer hot surfaces 54 of the pressure and suction sides 46, 48 of the outer walls 26. The gas temperature gradient T results in undesirable heat transfer from the hot gas flow 19 to the relatively colder yet hot outer walls 26.

The outer walls 26 are film cooled by using pressurized cooling air 35 which is a portion of the compressor discharge air 45 from last high pressure compressor stage 43 at a downstream end of the high pressure compressor 18 as illustrated in FIGS. 1 and 2. The portion of the compressor discharge air 45 flows around the outer combustion liner 76 and through liner apertures 44 in a downstream flange 47 of the outer combustion liner 76 into a cooling air plenum 56. The portion of the compressor discharge air 45 that flows into the cooling air plenum 56 is used as the cooling air 35 and flows into hollow interiors 41 of the airfoils 39.

Film cooling apertures 49, such as cylindrical or other shaped holes or slots, are disposed through the outer wall 26 on the pressure and suction sides 46, 48 of the airfoils 39 as illustrated in FIGS. 2, 3, and 4. The film cooling apertures 49 are used to flow cooling air 35 across the outer wall 26 and form a thermally protective cooling film 37 over the outer hot surface 54 of the wall 26. A downstream plasma boundary layer shielding system 11 illustrated in FIG. 1 is designed to improve the effectiveness of the cooling film 37 over the hot surfaces 54 of the walls 26 downstream of the film cooling apertures 49 by improving attachment of the cooling film 37 to the hot surfaces 54. The downstream plasma boundary layer shielding system 11 illustrated herein is for the airfoils 39 in the turbine nozzle 30 of the high pressure turbine 22. The downstream plasma boundary layer shielding system 11 may also be used to shield the film cooled outer hot surfaces 54 of walls 26 such as those found in the combustor 20 as well as other film cooled hot surfaces of other gas turbine engine components and non-gas turbine engine film cooled walls.

The film cooling apertures 49 are angled in a downstream direction D with respect to the hot gas flow 19. The film cooling apertures 49 extend across the wall 26 from a cold surface 59 of the wall 26 to the outer hot surface 54 of the wall 26 in a generally downstream direction D. The terms cold surface 59 and outer hot surface 54 are used to designate which of the surfaces are relatively cold and hot during operation of the engine or heating of the wall 26 and does not reflect their relative temperatures when the system 11 is not being operated. The film cooling apertures 49 are typically shallow with respect to the wall 26 and angled in the downstream direction D in order to entrain the film cooling air 35 in the boundary layer along the outer hot surface 54 and form the cooling film 37 over the hot surface. An electronic controller 51 may be used to control and turn on and off plasma generators 2 and an active clearance control system if the engine has one.

The downstream plasma boundary layer shielding system 11 illustrated in FIGS. 2-5 is designed to produce a body force to induce a flow hereinafter referred to as an induced flow 70 toward the hot surface and keeps the cooling film 37 attached to the outer hot surface 54 of the wall 26 downstream of the film cooling apertures 49. The downstream plasma boundary layer shielding system 11 forms a plasma 90 which produces a virtual aerodynamic shape that causes a change in the pressure distribution over the outer hot surfaces 54 of the outer walls 26 of the airfoils 39 as illustrated in FIG. 5. The pressure distribution caused by the virtual aerodynamic shape induces the plasma induced flow 70. The plasma induced flow 70 creates suction on the cooling film 37 keeping the film close to the hot surface 54 for better film cooling effectiveness.

The downstream plasma boundary layer shielding system 11 illustrated herein includes plasma generators 2 located on the outer hot surface 54 of the wall 26 downstream of the film cooling apertures 49 as illustrated in FIG. 5. A plasma generator 2 is disposed on each of the suction sides 48 and the pressure sides 46 of the airfoils 39 downstream or aft of the film cooling apertures 49. Each of the plasma generators 2 includes inner and outer electrodes 3, 4 separated by a dielectric material 5. The air near the electrodes is weakly ionized, and there is little or no heating of the air.

The plasma generators 2 produce an airfoil outer surface conforming plasma 90 along each of the outer hot surfaces 54 of the pressure and suction sides 46, 48 of the airfoils 39. The plasma 90 creates a virtual aerodynamic shape that causes a change in the pressure distribution over the outer hot surfaces 54 of the outer walls 26 of the airfoils 39 as illustrated in FIG. 5. This induces the induced flow 70 toward the hot surface and keeps the cooling film 37 attached to the outer hot surface 54 of the wall 26 downstream of the film cooling apertures 49. The plasma induced flow 70 creates suction on the cooling film 37 keeping the film close to the hot surface 54 for better film cooling effectiveness.

The downstream plasma boundary layer shielding system 11 improves the effectiveness of the cooling film 37 on the outer hot surfaces 54 and thus further reduces surface heat transfer between the gas flow 19 and the outer hot surfaces 54 of the outer walls 26 of the airfoils 39 due to the flow boundary layer 60. Reduction of heat transfer improves component life of the vane or other downstream plasma shielded film cooled component and lowers cooling flow requirement for the component and, thus, improves engine efficiency.

Referring to FIG. 5, an exemplary embodiment of the plasma generator 2 illustrated herein includes the plasma generators 2 mounted on the outer walls 26 of the vanes 32. Each of the plasma generators 2 includes inner and outer electrodes 3, 4 separated by a dielectric material 5. The dielectric material 5 is disposed within spanwise extending grooves 6 in the outer hot surfaces 54 of the outer walls 26 of the vanes 32. An AC power supply 100 is connected to the electrodes to supply a high voltage AC potential to the electrodes.

When the AC amplitude is large enough, the gas flow 19 ionizes in a region of largest electric potential forming the plasma 90. The plurality of plasma generators 2 produce a outer hot surface conforming plasma 90 which covers a substantial portion of the outer hot surface 54 of the vane 32. The plasma 90 generally begins at an edge 102 of the outer electrode 4 which is exposed to the gas flow 19 and spreads out over an area 104 projected by the outer electrode 4 which is covered by the dielectric material 5. It is known that airfoils using plasma generators have been shown to prevent flow separation over the airfoils.

When the plasma generators 2 are turned on, heat transfer to the outer walls 26 is reduced because of the more effective film cooling than when the plasma generators 2 are off. Therefore, heating from the hot gas flow 19 to the outer hot surfaces 54 of the suction sides 48 of the outer walls 26 of the airfoils 39 will also be smaller when the plasma generators 2 are on than when the plasma generators 2 are off. The plasma generators 2 may be operated in either steady state or unsteady modes.

The downstream plasma boundary layer shielding system 11 is illustrated in FIGS. 1-5 for use with the airfoils 39 of the turbine nozzle 30 of the high pressure turbine 22 and, more particularly, for use on both the pressure and suction sides 46, 48 of the airfoil's outer or hot wall. The downstream plasma boundary layer shielding system 11 may also be used along the inboard hot surfaces 52 of the inner and outer bands 38, 40 and on the inner and outer combustor liners 74, 76 of the main combustor 20 illustrated in FIG. 1. The downstream plasma boundary layer shielding system 11 may also be used on turbine nozzle airfoils in other stages of a high pressure turbine and in an afterburner combustor liner.

Figure 6:
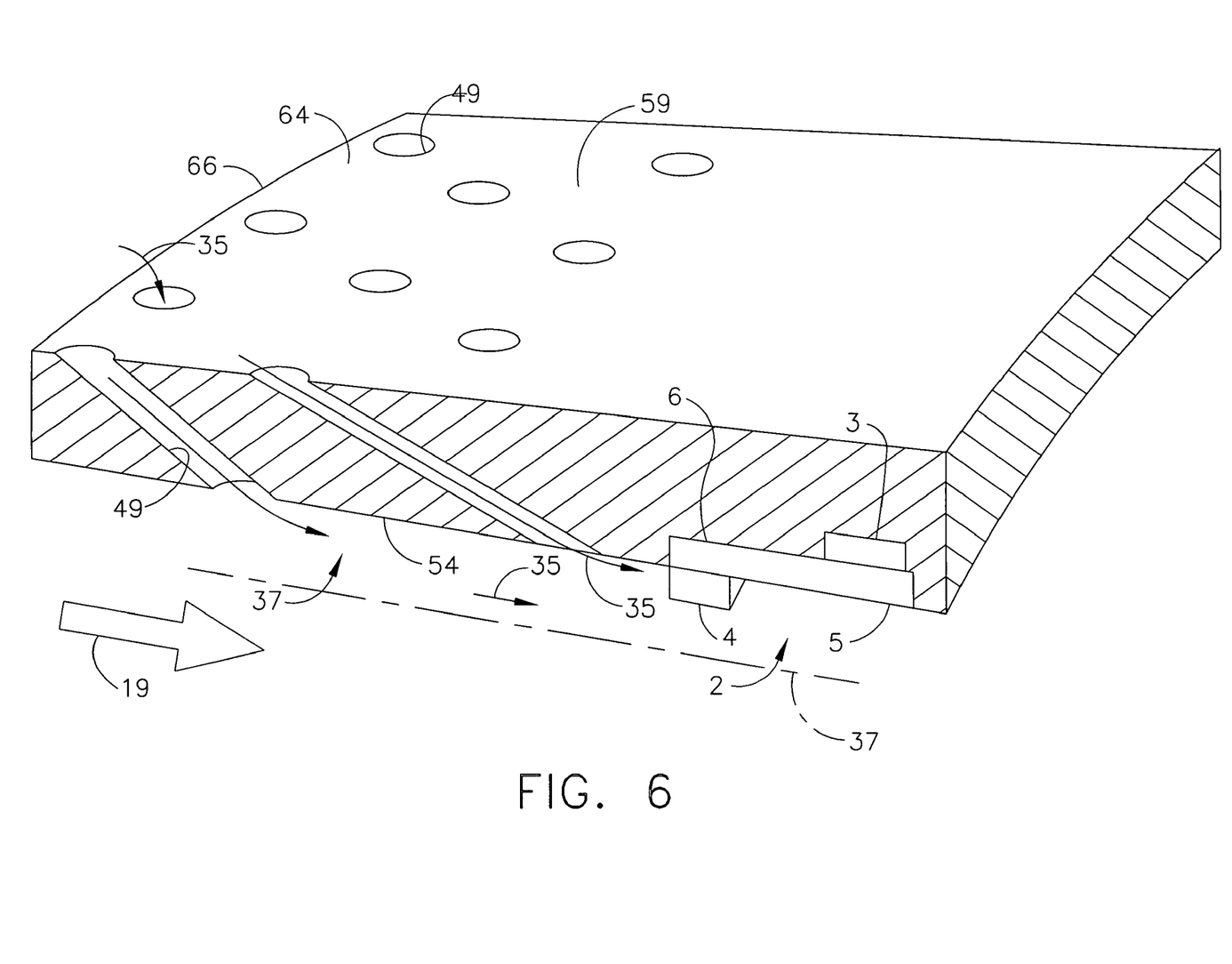
FIG. 6 is a perspective view of a gas turbine engine liner with an downstream plasma boundary layer shielding system.

An afterburner combustor or exhaust nozzle liner is illustrated in U.S. Pat. No. 5,465,572 and main combustor liner is more particularly illustrated in U.S. Pat. No. 5,181,379. A portion 64 of a gas turbine engine liner 66 is exemplified by an annular combustor liner 66 which may be from a main or afterburner combustor liner or an exhaust nozzle liner, as illustrated in FIG. 6. Combustor and exhaust nozzle liners are typically annular and circumscribed about the engine centerline axis 8. The dielectric material 5 is disposed within an annular groove 6 in inwardly facing hot surfaces or the wall that makes up the liners. Film cooling apertures 49, illustrated as being cylindrical, are disposed through the outer wall 26 which is illustrated as being annular.

The plasma generator 2 is located on the outer hot surface 54 of the wall 26 downstream of the film cooling apertures 49. The film cooling apertures 49 are angled in the downstream direction D with respect to the hot gas flow 19. The film cooling apertures 49 extend across the wall 26 from a cold surface 59 of the wall 26 to the outer hot surface 54 of the wall 26 in the generally downstream direction D. The film cooling apertures 49 are typically shallow with respect to the wall 26 and angled in the downstream direction D in order to entrain the film cooling air 35 in the boundary layer along the outer hot surface 54 and form the cooling film 37 over the hot surface. The cooling air 35 flows through the film cooling apertures 49 in a radially inwardly and in the downstream direction D. The downstream plasma boundary layer shielding system 11 may also be used in a two dimensional or otherwise shaped gas turbine engine nozzle or exhaust liner.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

1. An downstream plasma boundary layer shielding system comprising:
    film cooling apertures disposed through a wall,
    the film cooling apertures angled in a downstream direction from a cold surface of the wall to an outer hot surface of the wall, and
    a plasma generator located downstream of the film cooling apertures for producing a plasma extending over the hot surface of the wall downstream of the film cooling apertures.

2. A system as claimed in claim 1 further comprising the plasma generator being mounted on the wall.

3. A system as claimed in claim 2 further comprising the plasma generator including inner and outer electrodes separated by a dielectric material.

4. A system as claimed in claim 3 further comprising an AC power supply connected to the electrodes to supply a high voltage AC potential to the electrodes.

5. A system as claimed in claim 4 further comprising the dielectric material being disposed within a groove in the outer hot surface of the wall.

6. A system as claimed in claim 5 further comprising:
a gas turbine engine vane including the wall defining at least in part a hollow airfoil of the vane,
the airfoil extending radially in a spanwise direction between radially inner and outer bands respectively,
the airfoil extending in the downstream direction and in a chordwise direction between opposite leading and trailing edges, and
the plasma generator extending in the spanwise direction.

7. A system as claimed in claim 5 further comprising the wall and the groove being annular.

8. A system as claimed in claim 5 further comprising the wall being annular and defining at least in part a gas turbine engine annular combustor liner.

9. A system as claimed in claim 8 further comprising the groove being annular.

10. A system as claimed in claim 6 further comprising the airfoil being part of a high pressure turbine nozzle vane.

11. An downstream plasma boundary layer shielding system comprising:
a vane assembly including a row of circumferentially spaced apart and radially extending gas turbine engine vanes,
each of the vanes having a spanwise extending hollow airfoil,
the airfoil having an outer wall extending in a downstream direction and a chordwise direction between opposite leading and trailing edges,
the airfoil extending radially in a spanwise direction between radially inner and outer bands respectively,
film cooling apertures disposed through the wall and angled in a downstream direction from a cold surface of the wall to an outer hot surface of the wall, and
at least one plasma generator located downstream of the film cooling apertures for producing a plasma extending over the hot surface of the wall downstream of the film cooling apertures.

12. A system as claimed in claim 11 further comprising the plasma generator being mounted on the airfoil.

13. A system as claimed in claim 12 further comprising the plasma generator including inner and outer electrodes separated by a dielectric material.

14. A system as claimed in claim 13 further comprising the dielectric material being disposed within a spanwise extending groove in an outer hot surface of the airfoil.

15. A system as claimed in claim 14 further comprising an AC power supply connected to the electrodes to supply a high voltage AC potential to the electrodes.

16. A system as claimed in claim 11 further comprising the row of circumferentially spaced apart and radially extending gas turbine engine vanes having circumferential segments with two or more of the vanes per segment.

17. A method for operating an downstream plasma boundary layer shielding system, the method comprising energizing a plasma generator to form a plasma extending in a downstream direction over and along a hot surface of a wall downstream of film cooling apertures disposed through a wall and angled in a downstream direction from a cold surface of the wall to the hot surface of the wall.

18. A method as claimed in claim 17 further comprising an airfoil of one or more gas turbine engine vanes in a row of circumferentially spaced apart and radially extending gas turbine engine vanes, the airfoil including the wall, and the airfoil extending in the downstream direction and in a chordwise direction between opposite leading and trailing edges.

19. A method as claimed in claim 18 wherein the plasma generator extends in a spanwise direction and is located downstream of the film cooling apertures.

20. A method as claimed in claim 19 wherein the energizing further includes supplying an AC potential to inner and outer electrodes separated by a dielectric material of the plasma generator.

21. A method as claimed in claim 19 further comprising the dielectric material being disposed within a spanwise extending groove in an outer hot surface of the outer wall.

22. A method as claimed in claim 20 further comprising operating the plasma generator in steady state or unsteady modes.

23. A method as claimed in claim 17 further comprising a gas turbine engine liner including the wall.

24. A method as claimed in claim 23 wherein the liner, the wall, and the plasma generator are annular and the annular plasma generator is located downstream of the film cooling apertures.

25. A method as claimed in claim 24 further comprising the groove being annular and disposed in the outer hot surface of the wall.

26. A method as claimed in claim 25 wherein the energizing further includes supplying an AC potential to inner and outer electrodes separated by a dielectric material of the plasma generator.

27. A method as claimed in claim 26 further comprising operating the plasma generator in steady state or unsteady modes.

* * * * *